United States Patent
Laffargue et al.

(10) Patent No.: US 10,218,964 B2
(45) Date of Patent: *Feb. 26, 2019

(54) DIMENSIONING SYSTEM WITH FEEDBACK

(71) Applicant: Hand Held Products, Inc., Fort Mill, SC (US)

(72) Inventors: Franck Laffargue, Toulouse (FR); Jeffrey Hunt, Kirkland, WA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,719

(22) Filed: Nov. 13, 2017

(65) Prior Publication Data

US 2018/0146187 A1 May 24, 2018

Related U.S. Application Data

(63) Continuation of application No. 15/581,572, filed on Apr. 28, 2017, now Pat. No. 9,826,220, which is a (Continued)

(51) Int. Cl.
*G01B 11/02* (2006.01)
*G06T 17/20* (2006.01)
(Continued)

(52) U.S. Cl.
CPC ......... *H04N 13/271* (2018.05); *G01B 11/024* (2013.01); *G01B 11/25* (2013.01); *G06K 9/00201* (2013.01); *G06K 9/036* (2013.01); *G06K 9/22* (2013.01); *G06T 7/62* (2017.01); *G06T 17/20* (2013.01); *H04N 5/23293* (2013.01); *H04N 13/257* (2018.05); *G06T 2207/10024* (2013.01); *G06T 2207/10028* (2013.01); *H04N 2013/0077* (2013.01)

(58) Field of Classification Search
CPC ....... G01B 11/024; G06T 17/20; G06T 7/602; G06K 9/036; H04N 13/0271
USPC .................................................. 235/472.01
See application file for complete search history.

(56) References Cited

U.S. PATENT DOCUMENTS 3,971,065 A 7/1976 Bayer
4,026,031 A 5/1977 Siddall et al.
(Continued)

FOREIGN PATENT DOCUMENTS

AU 2004212587 A1 4/2005
CN 201139117 Y 10/2008
(Continued)

OTHER PUBLICATIONS

Office Action in counterpart European Application No. 131860439 dated Sep. 30, 2015, pp. 1-7.
(Continued)

*Primary Examiner* — Toan Ly
(74) *Attorney, Agent, or Firm* — Additon, Higgins & Pendleton, P.A.

(57) ABSTRACT

A dimensioning system that analyzes a distance map for null-data pixels to provide feedback is disclosed. Null-data pixels correspond to missing range data and having too many in a distance map may lead to dimensioning errors. Providing feedback based on the number of null-data pixels helps a user understand and adapt to different dimensioning conditions, promotes accuracy, and facilitates handheld applications.

20 Claims, 4 Drawing Sheets

Related U.S. Application Data continuation of application No. 14/519,195, filed on Oct. 21, 2014, now Pat. No. 9,752,864.

(51) Int. Cl.

| | | |
|---|---|---|
| *G06K 9/03* | (2006.01) | |
| *G06T 7/60* | (2017.01) | |
| *H04N 13/02* | (2006.01) | |
| *H04N 13/271* | (2018.01) | |
| *G06K 9/22* | (2006.01) | |
| *H04N 5/232* | (2006.01) | |
| *H04N 13/257* | (2018.01) | |
| *G06K 9/00* | (2006.01) | |
| *G06T 7/62* | (2017.01) | |
| *G01B 11/25* | (2006.01) | |
| *H04N 13/00* | (2018.01) | |

(56) References Cited

U.S. PATENT DOCUMENTS

| | | |
|---|---|---|
| 4,279,328 A | 7/1981 | Ahlbom |
| 4,398,811 A | 8/1983 | Nishioka et al. |
| 4,495,559 A | 1/1985 | Gelatt, Jr. |
| 4,730,190 A | 3/1988 | Win et al. |
| 4,803,639 A | 2/1989 | Steele et al. |
| 4,914,460 A | 4/1990 | Caimi et al. |
| 4,974,919 A | 12/1990 | Muraki et al. |
| 5,111,325 A | 5/1992 | DeJager |
| 5,175,601 A | 12/1992 | Fitts |
| 5,184,733 A | 2/1993 | Arnarson et al. |
| 5,198,648 A | 3/1993 | Hibbard |
| 5,220,536 A | 6/1993 | Stringer et al. |
| 5,243,619 A | 9/1993 | Albers et al. |
| 5,331,118 A | 7/1994 | Jensen |
| 5,359,185 A | 10/1994 | Hanson |
| 5,384,901 A | 1/1995 | Glassner et al. |
| 5,548,707 A | 8/1996 | LoNegro et al. |
| 5,555,090 A | 9/1996 | Schmutz |
| 5,561,526 A | 10/1996 | Huber et al. |
| 5,590,060 A | 12/1996 | Granville et al. |
| 5,592,333 A | 1/1997 | Lewis |
| 5,606,534 A | 2/1997 | Stringer et al. |
| 5,619,245 A | 4/1997 | Kessler et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,730,252 A | 3/1998 | Herbinet |
| 5,732,147 A | 3/1998 | Tao |
| 5,734,476 A | 3/1998 | Dlugos |
| 5,737,074 A | 4/1998 | Haga et al. |
| 5,748,199 A | 5/1998 | Palm |
| 5,767,962 A | 6/1998 | Suzuki et al. |
| 5,802,092 A | 9/1998 | Endriz |
| 5,808,657 A | 9/1998 | Kurtz et al. |
| 5,831,737 A | 11/1998 | Stringer et al. |
| 5,850,370 A | 12/1998 | Stringer et al. |
| 5,850,490 A | 12/1998 | Johnson |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | LoNegro et al. |
| 5,938,710 A | 8/1999 | Lanza et al. |
| 5,959,568 A | 9/1999 | Woolley |
| 5,960,098 A | 9/1999 | Tao |
| 5,969,823 A | 10/1999 | Wurz et al. |
| 5,978,512 A | 11/1999 | Kim et al. |
| 5,979,760 A | 11/1999 | Freyman et al. |
| 5,988,862 A | 11/1999 | Kacyra et al. |
| 5,991,041 A | 11/1999 | Woodworth |
| 6,009,189 A | 12/1999 | Schaack |
| 6,025,847 A | 2/2000 | Marks |
| 6,035,067 A | 3/2000 | Ponticos |
| 6,049,386 A | 4/2000 | Stringer et al. |
| 6,053,409 A | 4/2000 | Brobst et al. |
| 6,064,759 A | 5/2000 | Buckley et al. |
| 6,067,110 A | 5/2000 | Nonaka et al. |
| 6,069,696 A | 5/2000 | McQueen et al. |
| 6,115,114 A | 9/2000 | Berg et al. |
| 6,137,577 A | 10/2000 | Woodworth |
| 6,177,999 B1 | 1/2001 | Wurz et al. |
| 6,189,223 B1 | 2/2001 | Haug |
| 6,232,597 B1 | 5/2001 | Kley |
| 6,236,403 B1 | 5/2001 | Chaki |
| 6,246,468 B1 | 6/2001 | Dimsdale |
| 6,333,749 B1 | 12/2001 | Reinhardt et al. |
| 6,336,587 B1 | 1/2002 | He et al. |
| 6,369,401 B1 | 4/2002 | Lee |
| 6,373,579 B1 | 4/2002 | Ober et al. |
| 6,429,803 B1 | 8/2002 | Kumar |
| 6,457,642 B1 | 10/2002 | Good et al. |
| 6,507,406 B1 | 1/2003 | Yagi et al. |
| 6,517,004 B2 | 2/2003 | Good et al. |
| 6,519,550 B1 | 2/2003 | D'Hooge et al. |
| 6,535,776 B1 | 3/2003 | Tobin et al. |
| 6,661,521 B1 | 12/2003 | Stern |
| 6,674,904 B1 | 1/2004 | McQueen |
| 6,705,526 B1 | 3/2004 | Zhu et al. |
| 6,773,142 B2 | 8/2004 | Rekow |
| 6,781,621 B1 | 8/2004 | Gobush et al. |
| 6,804,269 B2 | 10/2004 | Lizotte et al. |
| 6,824,058 B2 | 11/2004 | Patel et al. |
| 6,858,857 B2 | 2/2005 | Pease et al. |
| 6,922,632 B2 | 7/2005 | Foxlin |
| 6,971,580 B2 | 12/2005 | Zhu et al. |
| 6,995,762 B1 | 2/2006 | Pavlidis et al. |
| 7,057,632 B2 | 6/2006 | Yamawaki et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,137,556 B1 | 11/2006 | Bonner et al. |
| 7,161,688 B1 | 1/2007 | Bonner et al. |
| 7,205,529 B2 | 4/2007 | Andersen et al. |
| 7,214,954 B2 | 5/2007 | Schopp |
| 7,233,682 B2 | 6/2007 | Levine |
| 7,277,187 B2 | 10/2007 | Smith et al. |
| 7,307,653 B2 | 12/2007 | Dutta |
| 7,310,431 B2 | 12/2007 | Gokturk et al. |
| 7,353,137 B2 | 4/2008 | Vock et al. |
| 7,509,529 B2 | 3/2009 | Colucci et al. |
| 7,527,205 B2 | 5/2009 | Zhu |
| 7,586,049 B2 | 9/2009 | Wurz |
| 7,602,404 B1 | 10/2009 | Reinhardt et al. |
| 7,614,563 B1 | 11/2009 | Nunnink et al. |
| 7,639,722 B1 | 12/2009 | Paxton et al. |
| 7,726,575 B2 | 6/2010 | Wang et al. |
| 7,780,084 B2 | 8/2010 | Zhang et al. |
| 7,788,883 B2 | 9/2010 | Buckley et al. |
| 7,912,320 B1 | 3/2011 | Minor |
| 7,974,025 B2 | 7/2011 | Topliss |
| 8,009,358 B2 | 8/2011 | Zalevsky et al. |
| 8,027,096 B2 | 9/2011 | Feng et al. |
| 8,028,501 B2 | 10/2011 | Buckley et al. |
| 8,050,461 B2 | 11/2011 | Shpunt et al. |
| 8,055,061 B2 | 11/2011 | Katano |
| 8,061,610 B2 | 11/2011 | Nunnink |
| 8,072,581 B1 | 12/2011 | Breiholz |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,149,224 B1 | 4/2012 | Kuo et al. |
| 8,194,097 B2 | 6/2012 | Xiao et al. |
| 8,201,737 B1 | 6/2012 | Palacios Durazo et al. |
| 8,212,158 B2 | 7/2012 | Wiest |
| 8,212,889 B2 | 7/2012 | Chanas et al. |
| 8,224,133 B2 | 7/2012 | Popovich et al. |
| 8,228,510 B2 | 7/2012 | Pangrazio et al. |
| 8,230,367 B2 | 7/2012 | Bell et al. |
| 8,301,027 B2 | 10/2012 | Shaw et al. |
| 8,305,458 B2 | 11/2012 | Hara |
| 8,310,656 B2 | 11/2012 | Zalewski |
| 8,313,380 B2 | 11/2012 | Zalewski et al. |

(56) References Cited

U.S. PATENT DOCUMENTS

| | | |
|---|---|---|
| 8,320,621 B2 | 11/2012 | McEldowney |
| 8,339,462 B2 | 12/2012 | Stec et al. |
| 8,350,959 B2 | 1/2013 | Topliss et al. |
| 8,351,670 B2 | 1/2013 | Ijiri et al. |
| 8,374,498 B2 | 2/2013 | Pastore |
| 8,381,976 B2 | 2/2013 | Mohideen et al. |
| 8,437,539 B2 | 5/2013 | Komatsu et al. |
| 8,441,749 B2 | 5/2013 | Brown et al. |
| 8,463,079 B2 | 6/2013 | Ackley et al. |
| 8,570,343 B2 | 10/2013 | Halstead |
| 8,576,390 B1 | 11/2013 | Nunnink |
| 8,594,425 B2 | 11/2013 | Gurman et al. |
| 8,792,688 B2 | 7/2014 | Unsworth |
| 8,810,779 B1 | 8/2014 | Hilde |
| 8,897,596 B1 | 11/2014 | Passmore et al. |
| 8,908,277 B2 | 12/2014 | Pesach et al. |
| 8,928,896 B2 | 1/2015 | Kennington et al. |
| 8,993,974 B2 | 3/2015 | Goodwin |
| 9,014,441 B2 | 4/2015 | Truyen et al. |
| 9,066,087 B2 | 6/2015 | Shpunt |
| 9,082,195 B2 | 7/2015 | Holeva et al. |
| 9,142,035 B1 | 9/2015 | Rotman et al. |
| 9,171,278 B1 | 10/2015 | Kong et al. |
| 9,233,470 B1 | 1/2016 | Bradski et al. |
| 9,235,899 B1 | 1/2016 | Kirmani et al. |
| 9,273,846 B1 | 3/2016 | Rossi et al. |
| 9,299,013 B1 | 3/2016 | Curlander et al. |
| 9,366,861 B1 | 6/2016 | Johnson |
| 9,424,749 B1 | 8/2016 | Reed et al. |
| 9,486,921 B1 | 11/2016 | Straszheim et al. |
| 9,736,459 B2 | 8/2017 | Mor et al. |
| 9,828,223 B2 | 11/2017 | Svensson et al. |
| 2001/0027995 A1 | 10/2001 | Patel et al. |
| 2001/0032879 A1 | 10/2001 | He et al. |
| 2002/0036765 A1 | 3/2002 | McCaffrey |
| 2002/0054289 A1 | 5/2002 | Thibault et al. |
| 2002/0067855 A1 | 6/2002 | Chiu et al. |
| 2002/0105639 A1 | 8/2002 | Roelke |
| 2002/0109835 A1 | 8/2002 | Goetz |
| 2002/0113946 A1 | 8/2002 | Kitaguchi et al. |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0196534 A1 | 12/2002 | Lizotte et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0078755 A1 | 4/2003 | Leutz et al. |
| 2003/0091227 A1 | 5/2003 | Chang et al. |
| 2003/0156756 A1 | 8/2003 | Gokturk et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0019274 A1 | 1/2004 | Galloway et al. |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1 | 6/2004 | Patel et al. |
| 2004/0122779 A1 | 6/2004 | Stickler et al. |
| 2004/0132297 A1 | 7/2004 | Baba et al. |
| 2004/0155975 A1 | 8/2004 | Hart et al. |
| 2004/0165090 A1 | 8/2004 | Ning |
| 2004/0184041 A1 | 9/2004 | Schopp |
| 2004/0211836 A1 | 10/2004 | Patel et al. |
| 2004/0214623 A1 | 10/2004 | Takahashi et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1 | 6/2005 | Lange |
| 2005/0128193 A1 | 6/2005 | Popescu et al. |
| 2005/0128196 A1 | 6/2005 | Popescu et al. |
| 2005/0168488 A1 | 8/2005 | Montague |
| 2005/0211782 A1 | 9/2005 | Martin |
| 2005/0240317 A1 | 10/2005 | Kienzle-Lietl |
| 2005/0257748 A1 | 11/2005 | Kriesel et al. |
| 2005/0264867 A1 | 12/2005 | Cho et al. |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0109105 A1 | 5/2006 | Varner et al. |
| 2006/0112023 A1 | 5/2006 | Horhann |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0213999 A1 | 9/2006 | Wang et al. |
| 2006/0230640 A1 | 10/2006 | Chen |
| 2006/0232681 A1 | 10/2006 | Okada |
| 2006/0255150 A1 | 11/2006 | Longacre |
| 2006/0269165 A1 | 11/2006 | Viswanathan |
| 2006/0276709 A1 | 12/2006 | Khamene et al. |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0116357 A1 | 5/2007 | Dewaele |
| 2007/0127022 A1 | 6/2007 | Cohen et al. |
| 2007/0143082 A1 | 6/2007 | Degnan |
| 2007/0153293 A1 | 7/2007 | Gruhlke et al. |
| 2007/0165013 A1 | 7/2007 | Goulanian et al. |
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0047760 A1 | 2/2008 | Georgitsis |
| 2008/0050042 A1 | 2/2008 | Zhang et al. |
| 2008/0056536 A1 | 3/2008 | Hildreth et al. |
| 2008/0062164 A1 | 3/2008 | Bassi et al. |
| 2008/0065509 A1 | 3/2008 | Williams |
| 2008/0077265 A1 | 3/2008 | Boyden |
| 2008/0079955 A1 | 4/2008 | Storm |
| 2008/0156619 A1 | 7/2008 | Patel et al. |
| 2008/0164074 A1 | 7/2008 | Wurz |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0273210 A1 | 11/2008 | Hilde |
| 2008/0278790 A1 | 11/2008 | Boesser et al. |
| 2009/0038182 A1 | 2/2009 | Lans et al. |
| 2009/0046296 A1 | 2/2009 | Kilpartrick et al. |
| 2009/0059004 A1 | 3/2009 | Bochicchio |
| 2009/0081008 A1 | 3/2009 | Somin et al. |
| 2009/0095047 A1 | 4/2009 | Patel et al. |
| 2009/0114818 A1 | 5/2009 | Casares et al. |
| 2009/0161090 A1 | 6/2009 | Campbell et al. |
| 2009/0189858 A1 | 7/2009 | Lev et al. |
| 2009/0195790 A1 | 8/2009 | Zhu et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler |
| 2009/0273770 A1 | 11/2009 | Bauhahn et al. |
| 2009/0313948 A1 | 12/2009 | Buckley et al. |
| 2009/0318815 A1 | 12/2009 | Barnes et al. |
| 2009/0323084 A1 | 12/2009 | Dunn et al. |
| 2009/0323121 A1 | 12/2009 | Valkenburg |
| 2010/0035637 A1 | 2/2010 | Varanasi et al. |
| 2010/0060604 A1 | 3/2010 | Zwart et al. |
| 2010/0091104 A1 | 4/2010 | Sprigle |
| 2010/0113153 A1 | 5/2010 | Yen et al. |
| 2010/0118200 A1 | 5/2010 | Gelman et al. |
| 2010/0128109 A1 | 5/2010 | Banks |
| 2010/0161170 A1 | 6/2010 | Siris |
| 2010/0171740 A1 | 7/2010 | Andersen et al. |

(56) References Cited

U.S. PATENT DOCUMENTS

| | | |
|---|---|---|
| 2010/0172567 A1 | 7/2010 | Prokoski |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1 | 9/2010 | Al-Shameri et al. |
| 2010/0245850 A1 | 9/2010 | Lee et al. |
| 2010/0254611 A1 | 10/2010 | Amz |
| 2010/0274728 A1 | 10/2010 | Kugelman |
| 2010/0303336 A1 | 12/2010 | Abraham |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1 | 2/2011 | Brenner et al. |
| 2011/0040407 A1 | 2/2011 | Lim |
| 2011/0043609 A1 | 2/2011 | Choi et al. |
| 2011/0075936 A1 | 3/2011 | Deaver |
| 2011/0081044 A1 | 4/2011 | Peeper |
| 2011/0099474 A1 | 4/2011 | Grossman et al. |
| 2011/0180695 A1 | 7/2011 | Li et al. |
| 2011/0188054 A1 | 8/2011 | Petronius et al. |
| 2011/0188741 A1 | 8/2011 | Sones et al. |
| 2011/0234389 A1 | 9/2011 | Mellin |
| 2011/0235854 A1 | 9/2011 | Berger et al. |
| 2011/0249864 A1 | 10/2011 | Venkatesan et al. |
| 2011/0254840 A1 | 10/2011 | Halstead |
| 2011/0260965 A1 | 10/2011 | Kim et al. |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1 | 11/2011 | Thierman |
| 2011/0297590 A1 | 12/2011 | Ackley et al. |
| 2011/0301994 A1 | 12/2011 | Tieman |
| 2011/0303748 A1 | 12/2011 | Lemma et al. |
| 2011/0310227 A1 | 12/2011 | Konertz et al. |
| 2012/0014572 A1 | 1/2012 | Wong et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0082383 A1 | 4/2012 | Kruglick |
| 2012/0113223 A1 | 5/2012 | Hilliges et al. |
| 2012/0113250 A1 | 5/2012 | Farlotti et al. |
| 2012/0126000 A1 | 5/2012 | Kunzig et al. |
| 2012/0140300 A1 | 6/2012 | Freeman |
| 2012/0168509 A1 | 7/2012 | Nunnink et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0197464 A1 | 8/2012 | Wang et al. |
| 2012/0218436 A1 | 9/2012 | Rodriguez et al. |
| 2012/0224026 A1 | 9/2012 | Bayer et al. |
| 2012/0224060 A1 | 9/2012 | Gurevich et al. |
| 2012/0236212 A1 | 9/2012 | Itoh et al. |
| 2012/0236288 A1 | 9/2012 | Stanley |
| 2012/0242852 A1 | 9/2012 | Hayward et al. |
| 2012/0256901 A1 | 10/2012 | Bendall |
| 2012/0261474 A1 | 10/2012 | Kawashime et al. |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0293625 A1 | 11/2012 | Schneider et al. |
| 2012/0294549 A1 | 11/2012 | Doepke |
| 2012/0299961 A1 | 11/2012 | Ramkumar et al. |
| 2012/0300991 A1 | 11/2012 | Mikio |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0314258 A1 | 12/2012 | Moriya |
| 2012/0316820 A1 | 12/2012 | Nakazato et al. |
| 2013/0019278 A1 | 1/2013 | Sun et al. |
| 2013/0038881 A1 | 2/2013 | Pesach et al. |
| 2013/0038941 A1 | 2/2013 | Pesach et al. |
| 2013/0050426 A1 | 2/2013 | Sarmast et al. |
| 2013/0076857 A1 | 3/2013 | Kurashige et al. |
| 2013/0093895 A1 | 4/2013 | Palmer et al. |
| 2013/0094069 A1 | 4/2013 | Lee et al. |
| 2013/0101158 A1 | 4/2013 | Lloyd et al. |
| 2013/0156267 A1 | 6/2013 | Muraoka et al. |
| 2013/0200150 A1 | 8/2013 | Reynolds et al. |
| 2013/0201288 A1 | 8/2013 | Billerbaeck et al. |
| 2013/0208164 A1 | 8/2013 | Cazier et al. |
| 2013/0211790 A1 | 8/2013 | Loveland et al. |
| 2013/0222592 A1 | 8/2013 | Gieseke |
| 2013/0223673 A1 | 8/2013 | Davis et al. |
| 2013/0291998 A1 | 11/2013 | Konnerth |
| 2013/0293539 A1 | 11/2013 | Hunt et al. |
| 2013/0293540 A1 | 11/2013 | Laffargue et al. |
| 2013/0307964 A1 | 11/2013 | Bremer et al. |
| 2013/0308013 A1 | 11/2013 | Li et al. |
| 2013/0317642 A1 | 11/2013 | Asaria |
| 2013/0329012 A1 | 12/2013 | Bartos |
| 2013/0329013 A1 | 12/2013 | Metois et al. |
| 2013/0342343 A1 | 12/2013 | Harring et al. |
| 2014/0002828 A1 | 1/2014 | Laffargue et al. |
| 2014/0009586 A1 | 1/2014 | McNamer et al. |
| 2014/0019005 A1 | 1/2014 | Lee et al. |
| 2014/0021259 A1 | 1/2014 | Moed et al. |
| 2014/0031665 A1 | 1/2014 | Pinto et al. |
| 2014/0034731 A1 | 2/2014 | Gao et al. |
| 2014/0039674 A1 | 2/2014 | Motoyama et al. |
| 2014/0049635 A1 | 2/2014 | Laffargue et al. |
| 2014/0058612 A1 | 2/2014 | Wong et al. |
| 2014/0062709 A1 | 3/2014 | Hyer et al. |
| 2014/0064624 A1 | 3/2014 | Kim et al. |
| 2014/0067104 A1 | 3/2014 | Osterhout |
| 2014/0071430 A1 | 3/2014 | Hansen et al. |
| 2014/0079297 A1 | 3/2014 | Tadayon et al. |
| 2014/0091147 A1 | 4/2014 | Evans et al. |
| 2014/0097238 A1 | 4/2014 | Ghazizadeh |
| 2014/0097252 A1 | 4/2014 | He et al. |
| 2014/0098091 A1 | 4/2014 | Hori |
| 2014/0098243 A1 | 4/2014 | Ghazizadeh |
| 2014/0100813 A1 | 4/2014 | Showering |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104664 A1 | 4/2014 | Lee |
| 2014/0135984 A1 | 5/2014 | Hirata |
| 2014/0139654 A1 | 5/2014 | Taskahashi |
| 2014/0142398 A1 | 5/2014 | Patil et al. |
| 2014/0152975 A1 | 6/2014 | Ko |
| 2014/0158468 A1 | 6/2014 | Adami |
| 2014/0168380 A1 | 6/2014 | Heidemann et al. |
| 2014/0177931 A1 | 6/2014 | Kocherscheidt et al. |
| 2014/0192187 A1 | 7/2014 | Atwell et al. |
| 2014/0192551 A1 | 7/2014 | Masaki |
| 2014/0201126 A1 | 7/2014 | Zadeh et al. |
| 2014/0205150 A1 | 7/2014 | Ogawa |
| 2014/0225918 A1 | 8/2014 | Mittal et al. |
| 2014/0225985 A1 | 8/2014 | Klusza et al. |
| 2014/0240454 A1 | 8/2014 | Lee |
| 2014/0247279 A1 | 9/2014 | Nicholas et al. |
| 2014/0247280 A1 | 9/2014 | Nicholas et al. |
| 2014/0267609 A1 | 9/2014 | Laffargue |
| 2014/0268093 A1 | 9/2014 | Tohme et al. |
| 2014/0270361 A1 | 9/2014 | Amma et al. |
| 2014/0306833 A1 | 10/2014 | Ricci |
| 2014/0307855 A1 | 10/2014 | Withagen et al. |
| 2014/0313527 A1 | 10/2014 | Askan |
| 2014/0319219 A1 | 10/2014 | Liu et al. |
| 2014/0320408 A1 | 10/2014 | Zagorsek et al. |
| 2014/0320605 A1 | 10/2014 | Johnson |
| 2014/0333775 A1 | 11/2014 | Naikal et al. |

(56) References Cited

U.S. PATENT DOCUMENTS

| | | |
|---|---|---|
| 2014/0347533 A1 | 11/2014 | Ovsiannikov et al. |
| 2014/0350710 A1 | 11/2014 | Gopalkrishnan et al. |
| 2014/0362184 A1 | 12/2014 | Jovanovski et al. |
| 2014/0379613 A1 | 12/2014 | Nishitani et al. |
| 2015/0003673 A1 | 1/2015 | Fletcher |
| 2015/0009100 A1 | 1/2015 | Haneda et al. |
| 2015/0009301 A1 | 1/2015 | Ribnick et al. |
| 2015/0009338 A1 | 1/2015 | Laffargue et al. |
| 2015/0036876 A1 | 2/2015 | Marrion et al. |
| 2015/0042791 A1 | 2/2015 | Metois et al. |
| 2015/0049347 A1 | 2/2015 | Laffargue et al. |
| 2015/0062160 A1 | 3/2015 | Sakamoto et al. |
| 2015/0062369 A1 | 3/2015 | Gehring et al. |
| 2015/0063676 A1 | 3/2015 | Lloyd et al. |
| 2015/0070158 A1 | 3/2015 | Hayasaka |
| 2015/0070489 A1 | 3/2015 | Hudman et al. |
| 2015/0116498 A1 | 4/2015 | Vartiainen et al. |
| 2015/0117749 A1 | 4/2015 | Chen et al. |
| 2015/0149946 A1 | 5/2015 | Benos et al. |
| 2015/0163474 A1 | 6/2015 | You |
| 2015/0178900 A1 | 6/2015 | Kim et al. |
| 2015/0182844 A1 | 7/2015 | Jang |
| 2015/0204662 A1 | 7/2015 | Kobayashi et al. |
| 2015/0213647 A1 | 7/2015 | Laffargue et al. |
| 2015/0219748 A1 | 8/2015 | Hyatt |
| 2015/0229838 A1 | 8/2015 | Hakim et al. |
| 2015/0248578 A1 | 9/2015 | Utsumi |
| 2015/0253469 A1 | 9/2015 | Le Gros et al. |
| 2015/0260830 A1 | 9/2015 | Ghosh et al. |
| 2015/0269403 A1 | 9/2015 | Lei et al. |
| 2015/0201181 A1 | 10/2015 | Herschbach |
| 2015/0276379 A1 | 10/2015 | Ni et al. |
| 2015/0308816 A1 | 10/2015 | Laffargue et al. |
| 2015/0316368 A1 | 11/2015 | Moench et al. |
| 2015/0325036 A1 | 11/2015 | Lee |
| 2015/0332463 A1 | 11/2015 | Galera et al. |
| 2015/0355470 A1 | 12/2015 | Herschbach |
| 2016/0048725 A1 | 2/2016 | Holz et al. |
| 2016/0070982 A1 | 2/2016 | Li et al. |
| 2016/0063429 A1 | 3/2016 | Varley et al. |
| 2016/0065912 A1 | 3/2016 | Peterson |
| 2016/0088287 A1 | 3/2016 | Sadi et al. |
| 2016/0090283 A1 | 3/2016 | Svensson et al. |
| 2016/0090284 A1 | 3/2016 | Svensson et al. |
| 2016/0094016 A1 | 3/2016 | Beach et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0138247 A1 | 5/2016 | Conway et al. |
| 2016/0138248 A1 | 5/2016 | Conway et al. |
| 2016/0138249 A1 | 5/2016 | Svensson et al. |
| 2016/0147408 A1 | 5/2016 | Bevis et al. |
| 2016/0164261 A1 | 6/2016 | Warren |
| 2016/0169665 A1 | 6/2016 | Deschenes et al. |
| 2016/0178915 A1 | 6/2016 | Mor et al. |
| 2016/0187186 A1 | 6/2016 | Coleman et al. |
| 2016/0187187 A1 | 6/2016 | Coleman et al. |
| 2016/0187210 A1 | 6/2016 | Coleman et al. |
| 2016/0191801 A1 | 6/2016 | Sivan |
| 2016/0202478 A1 | 7/2016 | Masson et al. |
| 2016/0203641 A1 | 7/2016 | Bostick et al. |
| 2016/0223474 A1 | 8/2016 | Tang et al. |
| 2016/0328854 A1 | 11/2016 | Kimura |
| 2016/0343176 A1 | 11/2016 | Ackley |
| 2017/0115490 A1 | 4/2017 | Hsieh et al. |
| 2017/0115497 A1 | 4/2017 | Chen et al. |
| 2017/0121158 A1 | 5/2017 | Wong |
| 2017/0139213 A1 | 5/2017 | Schmidtlin |
| 2017/0148250 A1 | 5/2017 | Angermayer |
| 2017/0018294 A1 | 6/2017 | Hardy et al. |
| 2017/0309108 A1 | 10/2017 | Sadovsky et al. |
| 2017/0336870 A1 | 11/2017 | Everett et al. |

FOREIGN PATENT DOCUMENTS

| | | |
|---|---|---|
| DE | 3335760 A1 | 4/1985 |
| DE | 10210813 A1 | 10/2003 |
| DE | 102007037282 A1 | 3/2008 |
| EP | 1111435 A2 | 6/2001 |
| EP | 1443312 A1 | 8/2004 |
| EP | 1112483 B1 | 5/2006 |
| EP | 1232480 B1 | 5/2006 |
| EP | 2013117 A1 | 1/2009 |
| EP | 2286932 A2 | 2/2011 |
| EP | 2372648 A2 | 10/2011 |
| EP | 2381421 A2 | 10/2011 |
| EP | 2533009 A1 | 12/2012 |
| EP | 2562715 A1 | 2/2013 |
| EP | 2722656 A1 | 4/2014 |
| EP | 2779027 A1 | 9/2014 |
| EP | 2833323 A2 | 2/2015 |
| EP | 2843590 A2 | 3/2015 |
| EP | 2845170 A1 | 3/2015 |
| EP | 2966595 A1 | 1/2016 |
| EP | 3006893 A1 | 3/2016 |
| EP | 3012601 A1 | 3/2016 |
| EP | 3007096 A1 | 4/2016 |
| GB | 2503978 A1 | 1/2014 |
| GB | 2525053 A | 10/2015 |
| GB | 2531928 A | 5/2016 |
| JP | H04129902 A | 4/1992 |
| JP | 200696457 A | 4/2006 |
| JP | 2007084162 A | 4/2007 |
| JP | 2008210276 A | 9/2008 |
| JP | 2014210646 A | 11/2014 |
| JP | 2015174705 A | 10/2015 |
| KR | 20100020115 A | 2/2010 |
| KR | 20110013200 A | 2/2011 |
| KR | 20110117020 A | 10/2011 |
| KR | 20120028109 A | 3/2012 |
| WO | 96/40425 A1 | 12/1996 |
| WO | 0077726 A1 | 12/2000 |
| WO | 0114836 A1 | 3/2001 |
| WO | 2006095110 A1 | 9/2006 |
| WO | 2007015059 A1 | 2/2007 |
| WO | 200712554 A1 | 11/2007 |
| WO | 2011017241 A1 | 2/2011 |
| WO | 2012175731 A1 | 12/2012 |
| WO | 2013021157 A1 | 2/2013 |
| WO | 2013033442 A1 | 3/2013 |
| WO | 2013166368 A1 | 11/2013 |
| WO | 20130184340 A1 | 12/2013 |
| WO | 2014023697 A1 | 2/2014 |
| WO | 2014102341 A1 | 7/2014 |
| WO | 2014149702 A1 | 9/2014 |
| WO | 2014151746 A1 | 9/2014 |
| WO | 2015006865 A1 | 1/2015 |
| WO | 2016020038 A1 | 2/2016 |
| WO | 2016061699 | 4/2016 |
| WO | 2016061699 A1 | 4/2016 |
| WO | 2016085682 A1 | 6/2016 |

OTHER PUBLICATIONS

Lloyd et al., "System for Monitoring the Condition of Packages Throughout Transit", U.S. Appl. No. 14/865,575, filed Sep. 25, 2015, 59 pages, not yet published.

McCloskey et al., "Image Transformation for Indicia Reading," U.S. Appl. No. 14/928,032, filed Oct. 30, 2015, 48 pages, not yet published.

Great Britain Combined Search and Examination Report in related Application GB1517842.9, dated Apr. 8, 2016, 8 pages.

Search Report in counterpart European Application No. 15182675.7, dated Dec. 4, 2015, 10 pages.

Wikipedia, "3D projection" Downloaded on Nov. 25, 2015 from www.wikipedia.com, 4 pages.

(56) References Cited

OTHER PUBLICATIONS

M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.
European Extended Search Report in Related EP Application No. 16172995.9, dated Aug. 22, 2016, 11 pages.
European Extended search report in related EP Application No. 15190306.9, dated Sep. 9, 2016, 15 pages.
Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.
European extended Search report in related EP Application 13785171.3, dated Sep. 19, 2016, 8 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.
El-Hakim et al., "A Knowledge-based Edge/Object Measurement Technique", Retrieved from the Internet: URL: https://www.researchgate.net/profile/Sabry_E1-Hakim/publication/44075058_A_Knowledge_Based_EdgeObject_Measurement_Technique/ links/00b4953b5faa7d3304000000.pdf [retrieved on Jul. 15, 2016] dated Jan. 1, 1993, 9 pages.
H. Sprague Ackley, "Automatic Mode Switching in a Volume Dimensioner", U.S. Appl. No. 15/182,636, filed Jun. 15, 2016, 53 pages, Not yet published.
Bosch Tool Corporation, "Operating/Safety Instruction for DLR 130", Dated Feb. 2, 2009, 36 pages.
European Search Report for related EP Application No. 16152477.2, dated May 24, 2016, 8 pages.
Mike Stensvold, "get the Most Out of Variable Aperture Lenses", published on www.OutdoorPhotogrpaher.com; dated Dec. 7, 2010; 4 pages, [As noted on search report retrieved from URL: http://www.outdoorphotographer.com/gear/lenses/get-the-most-out-ofvariable-aperture-lenses.html on Feb. 9, 2016].
Houle et al., "Vehical Positioning and Object Avoidance", U.S. Appl. No. 15/007,522 [not yet published], filed Jan. 27, 2016, 59 pages.
United Kingdom combined Search and Examination Report in related GB Application No. 1607394.2, dated Oct. 19, 2016, 7 pages.
European Search Report from related EP Application No. 16168216.6, dated Oct. 20, 2016, 8 pages.
European Extended Search Report in related EP Application No. 16190017.0, dated Jan. 4, 2017, 6 pages.
European Extended Search Report in related EP Application No. 16173429.8, dated Dec. 1, 2016, 8 pages [US 2013/0038881 cited on separate IDS filed concurrently herewith].
Extended European Search Report in related EP Application No. 16175410.0, dated Dec. 13, 2016, 5 pages.
European extended search report in related EP Application 16190833.0, dated Mar. 9, 2017, 8 pages [US Publication 2014/0034731 cited on separate IDS filed concurrently herewith].
United Kingdom Combined Search and Examination Report in related Application No. GB1620676.5, dated Mar. 8, 2017, 6 pages [References cited on separate IDS filed concurrently herewith; WO2014/151746, WO2012/175731, US 2014/0313527, GB2503978].
European Exam Report in related , EP Application No. 16168216.6, dated Feb. 27, 2017, 5 pages, [cited on separate IDS filed concurrently herewith; WO2011/017241 and US 201410104413].
EP Search Report in related EP Application No. 17171844 dated Sep. 18, 2017. 4 pages [Only new art cited herein; some art has been cited on separate IDS filed concurrently herewith}.
EP Extended Search Report in related EP Applicaton No. 17174843.7 dated Oct. 17, 2017, 5 pages {Only new art cited herein; some art has been cited on separate IDS filed concurrently herewith}.
UK Further Exam Report in related UK Application No. GB1517842.9, dated Sep. 1, 2017, 5 pages (only new art cited herein; some art cited on separate IDS filed concurrently herewith).
European Exam Report in related EP Application No. 15176943.7, dated Apr. 12, 2017, 6 pages [Art cited on separate IDS filed concurrently herewith].
European Exam Report in related EP Application No. 15188440.0, dated Apr. 21, 2017, 4 pages [Art has been cited on separate IDS filed concurrently herewith.].
European Examination report in related EP Application No. 14181437.6, dated Feb. 8, 2017, 5 pages [References cited on separate IDS filed concurrently herewith].
Chinese Notice of Reexamination in related Chinese Application 201520810313.3, dated Mar. 14, 2017, English Computer Translation provided, 7 pages [References cited on separate IDS filed concurrently herewith].
Extended European search report in related EP Application 16199707.7, dated Apr. 10, 2017, 15 pages.
Ulusoy et al., One-Shot Scanning using De Bruijn Spaced Grids, 2009 IEEE 12th International Conference on Computer Vision Workshops, ICCV Workshops, 7 pages [Cited in EP Extended search report dated Apr. 10, 2017; NPL 14].
European Exam Report in related EP Application No. 16152477.2, dated Jun. 20, 2017, 4 pages [References cited on separate IDS filed concurrently herewith].
European Exam Report in related EP Applciation 16172995.9, dated Jul. 6, 2017, 9 pages [References cited on separate IDS filed concurrently herewith].
United Kingdom Search Report in related Application No. GB1700338.5, dated Jun. 30, 2017, 5 pages.
European Search Report in related EP Application No. 17175357.7, dated Aug. 17, 2017, pp. 1-7 [References cited on separate IDS filed concurrently herewith].
Peter Clarke, Actuator Developer Claims Anti-Shake Breakthrough for Smartphone Cams, Electronic Engineering Times, p. 24, May 16, 2011. [Previously cited and provided in parent application].
Spiller, Jonathan; Object Localization Using Deformable Templates, Master's Dissertation, University of the Witwatersrand, Johannesburg, South Africa, 2007; 74 pages [Previously cited and provided in parent application].
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages. [Previously cited and provided in parent application].
European Search Report for application No. EP13186043 dated Feb. 26, 2014 (now EP2722656 (Apr. 23, 2014)): Total pp. 7 [Previously cited and provided in parent application].
International Search Report for PCT/US2013/039438 (WO2013166368), dated Oct. 1, 2013, 7 pages [Previously cited and copy provided in parent application].
Lloyd, Ryan and Scott McCloskey, "Recognition of 3D Package Shapes for Singe Camera Metrology" IEEE Winter Conference on Applications of computer Visiona, IEEE, Mar. 24, 2014, pp. 99-106, {retrieved on Jun. 16, 2014}, Authors are employees of common Applicant [Previously cited and provided in parent application].
European Office Action for application EP 13186043, dated Jun. 12, 2014(now EP2722656 (dated Apr. 23, 2014)), Total of 6 pages [Previously cited and provided in parent application].
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages. [Previously cited and provided in parent application].
U.S. Appl. No. 14/801,023, Tyler Doomenbal et al., filed Jul. 16, 2015, not published yet, Adjusting Dimensioning Results Using Augmented Reality, 39 pages [Previously cited and provided in parent application].
Wikipedia, YUV description and definition, downloaded from http://www.wikipeida.org/wiki/YUV on Jun. 29, 2012, 10 pages [Previously cited and provided in parent application].
YUV Pixel Format, downloaded from http://www.fource.org/yuv.php on Jun. 29, 2012; 13 pages [Previously cited and provided in parent application].

(56) References Cited

OTHER PUBLICATIONS

YUV to RGB Conversion, downloaded from http://www.fource.org/fccyvrgb.php on Jun. 29, 2012; 5 pages [Previously cited and provided in parent application].
Benos et al., "Semi-Automatic Dimensioning with Imager of a Portable Device," U.S. Appl. No. 61/149,912, filed Feb. 4, 2009 (now expired), 56 pages. [Previously cited and provided in parent application].
Dimensional Weight—Wikipedia, the Free Encyclopedia, URL= http://en.wikipedia.org/wiki/Dimensional_weight, download date Aug. 1, 2008, 2 pages. [Previously cited and provided in parent application].
Dimensioning—Wikipedia, the Free Encyclopedia, URL=http://en.wikipedia.org/wiki/Dimensioning, download date Aug. 1, 2008, 1 page [Previously cited and provided in parent application].
European Patent Office Action for Application No. 14157971.4-1906, dated Jul. 16, 2014, 5 pages. [Previously cited and provided in parent application].
European Patent Search Report for Application No. 14157971.4-1906, dated Jun. 30, 2014, 6 pages. [Previously cited and provided in parent application].
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages [Previously cited and provided in parent application].
Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008), 6 pages [Previously cited and provided in parent application].
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages [Previously cited and provided in parent application].
Proesmans, Marc et al. "Active Acquisition of 3D Shape for Moving Objects" 0/7803-3258-X/96 1996 IEEE; 4 page [Previously cited and provided in parent application].
Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages [previously cited and copy provided in parent application].
EP Search and Written Opinion Report in related matter EP Application No. 14181437.6, dated Mar. 26, 2015, 7 pages, [Previously cited and provided in parent application].
Hetzel, Gunter et al.; "3D Object Recognition from Range Images using Local Feature Histograms,", Proceedings 2OO1 IEEE Conference on Computer Vision and Pattern Recognition. CVPR 2001. Kauai, Hawaii, Dec. 8-14, 2001; pp. 394-399, XP010584149, ISBN: 978-0/7695-1272-3. [Previously cited and provided in parent application].
Second Chinese Office Action in related CN Application No. 201520810685.6, dated Mar. 22, 2016, 5 pages, no references. [Previously cited and provided in parent application].
European Search Report in related EP Application No. 15190315.0, dated Apr. 1, 2016, 7 pages [Previously cited and provided in parent application].
Second Chinese Office Action in related CN Application No. 2015220810562.2, dated Mar. 22, 2016, 5 pages. English Translation provided [No references] [Previously cited and provided in parent application].
European Search Report for related Application EP 15190249.1, dated Mar. 22, 2016, 7 pages. [Previously cited and provided in parent application].
Second Chinese Office Action in related CN Application No. 201520810313.3, dated Mar. 22, 2016, 5 pages. English Translation provided [No references].

U.S. Appl. No. 14/800,757, Eric Todeschini, filed Jul. 16, 2015, not published yet, Dimensioning and Imaging Items, 80 pages [Previously cited and provided in parent application].
U.S. Appl. No. 14/747,197, Serge Thuries et al., filed Jun. 23, 2015, not published yet, Optical Pattern Projector; 33 pages [Previously cited and provided in parent application].
U.S. Appl. No. 14/747,490, Brian L. Jovanovski et al., filed Jun. 23, 2015, not published yet, Dual-Projector Three-Dimensional Scanner; 40 pages [Previously cited and provided in parent application].
Search Report and Opinion in related GB Application No. 1517112.7, dated Feb. 19, 2016, 6 Pages [Previously cited and provided in parent application].
U.S. Appl. No. 14/793,149, H. Sprague Ackley, filed Jul. 7, 2015, not published yet, Mobile Dimensioner Apparatus for Use in Commerce; 57 pages [Previously cited and provided in parent application].
U.S. Appl. No. 14/740,373, H. Sprague Ackley et al., filed Jun. 16, 2015, not published yet, Calibrating a Volume Dimensioner; 63 pages [Previously cited and provided in parent application].
Intention to Grant in counterpart European Application No. 14157971.4 dated Apr. 14, 2015, pp. 1-8 [Previously cited and provided in parent application].
Decision to Grant in counterpart European Application No. 14157971.4 dated Aug. 6, 2015, pp. 1-2 [Previously cited and provided in parent application].
Leotta, Matthew, Generic, Deformable Models for 3-D Vehicle Surveillance, May 2010, Doctoral Dissertation, Brown University, Providence RI, 248 pages [Previously cited and provided in parent application].
Ward, Benjamin, Interactive 3D Reconstruction from Video, Aug. 2012, Doctoral Thesis, Univesity of Adelaide, Adelaide, South Australia, 157 pages [Previously cited and provided in parent application].
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages [Previously cited and provided in parent application].
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages [Previously cited and provided in parent application].
Reisner-Kollmann,Irene; Anton L. Fuhrmann, Werner Purgathofer, Interactive Reconstruction of Industrial Sites Using Parametric Models, May 2010, Proceedings of the 26th Spring Conference of Computer Graphics SCCG "10, 8 pages [Previously cited and provided in parent application].
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages [Previously cited and provided in parent application].
European Search Report for Related EP Application No. 15189214.8, dated Mar. 3, 2016, 9 pages [Previously cited and provided in parent application].
Santolaria et al. "A one-step intrinsic and extrinsic calibration method for laster line scanner operation in coordinate measuring machines", dated Apr. 1, 2009, Measurement Science and Technology, IOP, Bristol, GB, vol. 20, No. 4; 12 pages [Previously cited and provided in parent application].
Search Report and Opinion in Related EP Application 15176943.7, dated Jan. 8, 2016, 8 pages [Previously cited and provided in parent application].
European Search Report for related EP Application No. 15188440.0, dated Mar. 8, 2016, 8 pages. [Previously cited and provided in parent application].
United Kingdom Search Report in related application GB1517842.9, dated Apr. 8, 2016, 8 pages [Previously cited and provided in parent application].
Great Britain Search Report for related Application On. GB1517843.7, dated Feb. 23, 2016; 8 pages [Previously cited and provided in parent application].

(56) References Cited

OTHER PUBLICATIONS

Ulusoy, Ali Osman et al.; "One-Shot Scanning using De Bruijn Spaced Grids", Brown University; 2009 IEEE 12th International Conference on Computer Vision Workshops, ICCV Workshops, pp. 1786-1792 [Cited in EPO Search Report dated Dec. 5, 2017}.
Extended European Search report in related EP Application No. 17189496.7 dated Dec. 5, 2017; 9 pages.
Extended European Search report in related EP Application No. 17190323.0 dated Jan. 19, 2018; 6 pages [Only new art cited herein].
Examination Report in related GB Application No. GB1517843.7, dated Jan. 19, 2018, 4 pages [Only new art cited herein].
Examination Report in related EP Application No. 15190315, dated Jan. 26, 2018, 6 pages [Only new art cited herein].
Padzensky, Ron; "Augmera; Gesture Control", dated Apr. 18, 2015, 15 pages [Office Action dated Jan. 20, 2017 in related Application.].
Grabowski, Ralph; "New Commands in AutoCADS 2010: Part 11 Smoothing 3D Mesh Objects" Dated 2011, 6 pages, [Office Action dated Jan. 20, 2017 in related Application.].
Theodoropoulos, Gabriel; "Using Gesture Recognizers to Handle Pinch, Rotate, Pan, Swipe, and Tap Gestures" dated Aug. 25, 2014, 34 pages, [Office Action dated Jan. 20, 2017 in related Application.].
Boavida et al., "Dam monitoring using combined terrestrial imaging systems", 2009 Civil Engineering Survey De/Jan. 2009, pp. 33-38 {Cited in Notice of Allowance dated Sep. 15, 2017 in related matter}.
Ralph Grabowski, "Smothing 3D Mesh Objects," New Commands in AutoCAD 2010: Part 11, related matter Non Final Office Action dated May 19, 2017; 6 pages.
Wiikipedia, "Microlens", Downloaded from https://en.wikipedia.org/wiki/Microlens, pp. 3. {Feb. 9, 2017 Final Office Action in related matter}.
Fukaya et al., "Characteristics of Speckle Random Pattern and Its Applications", pp. 317-327, Nouv. Rev. Optique, t.6, n.6. (1975)
{Feb. 9, 2017 Final Office Action in related matter: downloaded Mar. 2, 2017 from http://iopscience.iop.org}.
Thorlabs, NPL in Advisory Action dated Apr. 12, 2017 in related commonly owned application, downloaded from https://www.thorlabs.com/newgrouppage9.cfm?objectgroup_id=6430, 4 pages.
EKSMA Optics, NPL in Advisory Action dated Apr. 12, 2017 in related commonly owned application, downloaded from http://eksmaoptics.com/optical-systems/f-theta-lenses/f-theta-lens-for-1064-nm/, 2 pages.
Sill Optics, NPL in Advisory Action dated Apr. 12, 2017 in related commonly owned application, http://www.silloptics.de/1/products/sill-encyclopedia/laser-optics/f-theta-lenses/, 4 pages.
European Extended Search Report in related EP Application No. 17201794.9, dated Mar. 16, 2018, 10 pages [Only new art cited herein].
European Extended Search Report in related EP Application 17205030.4, dated Mar. 22, 2018, 8 pages.
European Exam Report in related EP Application 16172995.9, dated Mar. 15, 2018, 7 pages (Only new art cited herein).
United Kingdom Combined Search and Examination Report dated Mar. 21, 2018, 5 pages (Art has been previously cited).
European extended Search Report in related Application No. 17207882.6 dated Apr. 26, 2018, 10 pages.
United Kingdom Further Exam Report in related application GB1607394.2 dated Oct. 5, 2018; 5 pages {Only new art cited here in].
European Extended Search Report in related EP application 18184864.9, dated Oct. 30, 2018, 7 pages.
Combined Search and Examination Report in related UK Application No. GB1817189.2 dated Nov. 14, 2018, pp. 1-4.
United Kingdom Further Examination Report in related GB Patent Application No. 1517842.9 dated Jul. 26, 2018; 5 pages [Cited art has been previously cited in this matter].
United Kingdom Further Examination Report in related GB Patent Application No. 1517112.7 dated Jul. 17, 2018; 4 pages [No art cited].
United Kingdom Further Examination Report in related GB Patent Application No. 1620676.5 dated Jul. 17, 2018; 4 pages [No art cited].

DIMENSIONING SYSTEM WITH FEEDBACK

CROSS-REFERENCE TO RELATED APPLICATIONS

The present application claims the benefit of U.S. patent application Ser. No. 15/581,572 for a Dimensioning System with Feedback filed Apr. 28, 2017 (and published Aug. 10, 2017 as U.S. Patent Publication No. 2017/0230639), now U.S. Pat. No. 9,826,220, which claims the benefit of U.S. patent application Ser. No. 14/519,195 for a Handheld Dimensioning System with Feedback filed Oct. 21, 2014 (and published Apr. 21, 2016 as U.S. Patent Publication No. 2016/0109220), now U.S. Pat. No. 9,638,512. Each of the foregoing patent applications, patent publications, and patents is hereby incorporated by reference in its entirety.

FIELD OF THE INVENTION

The present invention relates to dimensioning systems, and in particular, to a dimensioning system that can provide feedback relating to the quality of data used for a dimension measurement.

BACKGROUND

Hands-free measurements of an object's dimensions (e.g., volume) may be carried out using a dimensioning system. Dimensioning systems can compute a package's volume to facilitate its storage, handling, transporting, and/or invoicing. Most transport vehicles have both volume and weight capacity limits, and an inefficient use of space results if the transport vehicle becomes full before its weight capacity is reached. By dimensioning packages, shipping companies can fill space optimally and compute shipping charges accurately. For this reason, dimensioning systems that accurately gather volume information, without causing disruptions in workflow, are highly desirable.

Handheld dimensioners require no dedicated setup to measure a dimension. These devices are small (e.g., fit into a user's hand) and convenient since the dimensioner is mobile. The handheld dimensioner can be positioned in a wide variety of environments. These environments may vary considerably because of lighting, object positioning, and/or object coloring. Some environments are not suitable for dimensioning; however, this is not always obvious to a user.

A need, therefore, exists for a handheld dimensioning system configured to (i) analyze the quality of the data used for dimensioning and (ii) provide feedback regarding this data, especially where dimensioning errors might otherwise result.

SUMMARY

Accordingly, in one aspect, the present invention embraces a method for obtaining a dimension measurement using a handheld dimensioner. The method includes the step of using a processor to receive range data from a dimensioning subsystem. From the range data, a processor creates a depth map. The depth map is analyzed, using the processor, to determine the depth map's null-data pixel count, wherein the null-data pixel count is the sum total of the null-data pixels. If the null-data pixel count is at or below a threshold count, then the processor computes a dimension measurement. Alternatively, if the null-data pixel-count is above the threshold count, then the processor generates an error feedback.

In an exemplary embodiment, the processor generates a confidence feedback if the depth-map's null-data pixel count is below the threshold count. An exemplary confidence feedback is a visible image of the handheld dimensioner's field-of-view including a wireframe rendering of an object. Another exemplary confidence feedback is a confidence value corresponding to the null-data pixel count. Yet another exemplary confidence feedback indicates that the dimension measurement conforms to a standard.

In another exemplary embodiment, the processor generates a user-guidance feedback if the null-data pixel count is above the threshold count. An exemplary user-guidance feedback is information to facilitate the adjustment of a measurement geometry. Another exemplary user-guidance feedback embodiment is information to facilitate the adjustment of lighting.

In another aspect, the present invention embraces a handheld dimensioning system configured to provide error feedback. The dimensioning system includes a dimensioning subsystem with at least one image sensor for capturing range data of an object or objects within a field-of-view. The dimensioning system also includes a control subsystem communicatively coupled to the at least one image sensor. The control subsystem includes at least one processor and at least one non-transitory storage medium for storing information and processor-executable instructions. The processor-executable instructions configure the processor to perform several functions. The processor is configured to receive range data from the dimensioning subsystem and to create a depth map from the range data. The processor is then configured to processes the depth map to obtain a depth-map quality. If the depth-map quality is below a minimum quality threshold, then the processor is configured to generate an error feedback.

In an exemplary embodiment, the depth-map quality includes a sum of the number of pixels in the depth map having insufficient information to determine depth.

In another exemplary embodiment, the handheld dimensioning system includes a pattern projector to project a light pattern onto the object or objects in the field-of-view.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a handheld dimensioning system (i.e., dimensioner) that provides feedback regarding the quality of the range data used for dimensioning. This qualitative feedback is especially important in handheld dimensioning.

Handheld dimensioning is a challenging problem. In handheld dimensioning applications, the measurement environment is uncontrolled, and the dimensioner must accommodate a wide range of measurement conditions. These measurement conditions include diverse lighting conditions, measurement geometries (e.g., spatial relationships and orientations), and/or object colors.

Handheld applications typically have a low tolerance for excessive measurement times and/or alignment complexities. A handheld dimensioner must employ robust sensing technologies with quality assurance feedback to achieve reliable measurements in adverse measurement conditions.

A variety of sensing technologies have been employed for dimensioning (e.g., time-of-flight sensing or stereoscopic imaging) to capture range data (i.e., depth data). One exemplary sensing technology, well suited for handheld dimensioners, uses structured light to capture range data. Structured-light dimensioners sense depth by projecting a known light pattern (e.g., dots, grids, bars, stripes, checkerboard, etc.) onto a scene (i.e., field-of-view). A pattern image is captured by an image sensor laterally offset from the projector. Distortions in the reflected light pattern caused by objects in the field-of-view are analyzed to derive depth (i.e., range) information.

A handheld-dimensioner's dimensioning subsystem may use structured light to sample spatially the range between the dimensioning system and an object (or objects) within the field-of-view. These samples combine to form a two dimensional (2D) array of range data. This range data is used to create a depth map.

Figure 1:
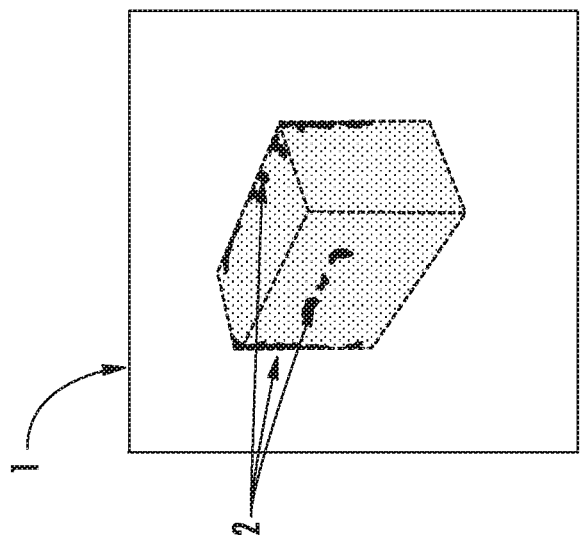
FIG. 1 depicts an image of an exemplary depth map.

A typical depth map is shown in FIG. 1. The depth map 1 is a two-dimensional digital image wherein the pixel values correspond to the sampled range. For the exemplary depth map in FIG. 1, close (i.e., short-range) pixels are lighter, while far (i.e., long range) pixels are darker.

Some pixels in the depth map 1 are black. These black pixels represent null-data pixels 2. Null-data pixels are points in the field-of-view that provided insufficient information to determine depth (i.e., range). Black null-data pixels are shown in the depth map 1; however, any pixel value could represent null-data pixels 2.

A variety of measurement conditions cause null-data pixels. One such condition is lighting. Suitable lighting is necessary to capture images of the light pattern used in structured-light dimensioners. Too little light may lead to noisy images, while excessive light may lead to saturated images. The lighting must also be uniform. Images with dark areas and saturated areas may have null-data pixels in both, since the dynamic range of the image sensor is often too small to capture both ideally.

Figure 2:
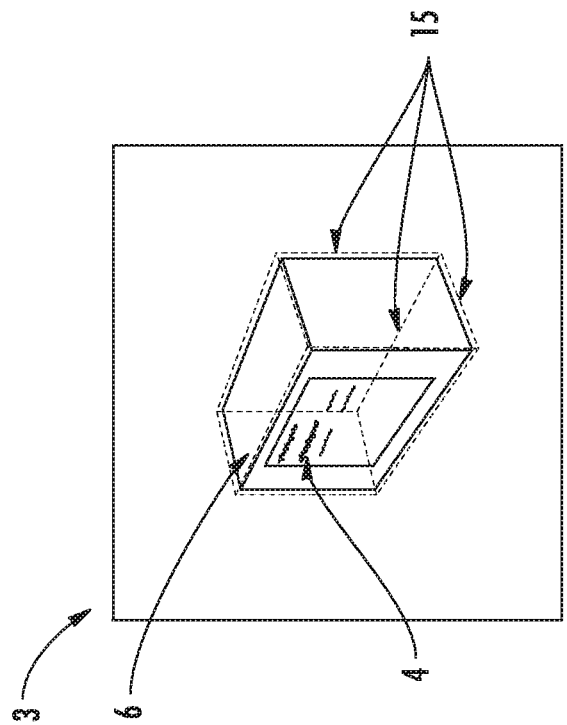
FIG. 2 depicts an exemplary feedback including a visible image of an object and a wireframe rendering of the object.

The depth map 1 in FIG. 1 has null-data pixels 2 along some edges and on the largest object surface shown. FIG. 2 shows visual feedback of the object. The feedback includes a visible image 3 of the object and shows that the source of the null-data pixels 2 is the darkly colored printing 4 on the side of the object. The printing 4 is reflects light poorly, leading to a low-light imaging condition. The light pattern (in this area) cannot be imaged to determine range. These pixels are assigned a zero value (i.e., null-data pixels). Object color can cause null-data pixels 2, and is a fact that may not be obvious without evaluating the depth map.

Figure 3:
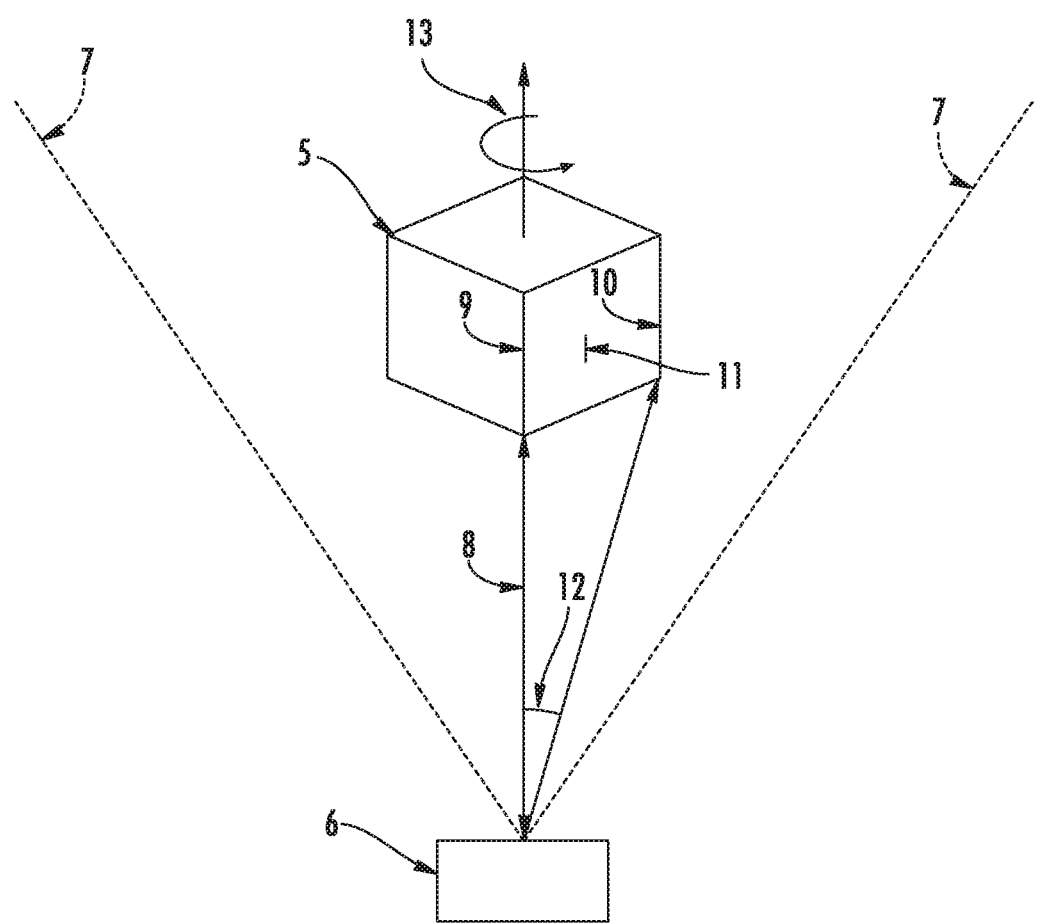
FIG. 3 schematically depicts an exemplary measurement geometry.

Certain measurement geometries can also lead to null-data pixels 2. Here measurement geometry refers to the measurement setup (e.g., spatial relationships and/or orientations). FIG. 3 depicts an exemplary measurement geometry. An object 5 for dimensioning is placed within a dimensioning system's 6 field-of-view 7. The object 5 is positioned at a range 8 (i.e., the distance between the dimensioning system and the object). Typically, three sides of the object are visible (to the dimensioner) for volume measurements. A surface 11 is visible when two of its edges 9,10 create an angle 12 (i.e., an angle with respect to the dimensioner's optical axis) that is greater than zero. Larger angles 12 imply more surface visibility. Feedback to facilitate the positioning of an object (or dimensioner) to maximize surface visibility is helpful in obtaining accurate dimensioning results.

When using a structured light dimensioner, an object's side must reflect some minimum portion of the projected light pattern to convey depth information (i.e., range data). For the measurement geometry in FIG. 3, the object 5 can be rotated 13 to adjust the angle 12 so that a surface 11 reflects more of the projected light pattern. Without feedback, it may be difficult to make this adjustment.

Feedback is necessary to quantify the quality of the depth map. The depth-map quality is typically determined by quantifying the number of null-data pixels in the depth map (i.e., null-data pixel-count). For example, the null-data pixel-count is the sum of the null-data pixels in a depth map.

The null-data pixel-count may determine the feedback type. If the null-data pixel-count is above a threshold count, then the processor may generate an error feedback. In another exemplary embodiment, if the ratio of the null-data pixel-count to the total number of pixels for a surface is higher than a threshold (e.g., 10%), then error feedback may be generated. Error feedback may indicate that the depth map is not suitable for dimensioning and could cause a measurement error or inaccuracy.

When the dimensioning system employs a time-of-flight sensor to generate three-dimensional data, the depth map is replaced with a distance map but the functionality is the same. Here each distance-map pixel may be assigned a confidence value. This confidence value may be averaged over the image or over a surface within the image. If the average confidence value over a prescribed area is below a threshold (e.g., 80%) then the processor may generate an error feedback. The error feedback may indicate that the distance map is not suitable for dimensioning and could cause a measurement error or inaccuracy.

Error feedback may include an indication that the handheld dimensioner cannot produce a dimension measurement under the current conditions. Error feedback may also include an indication that at least one object surface is not visible. In another embodiment, the error feedback may include an indication that the object color is too dark or that the lighting is insufficient. In some embodiments user-guidance feedback is provided in addition to (or instead of) error feedback whenever the threshold count is exceeded.

User-guidance feedback provides information to facilitate the adjustment of the measurement setup to improve the depth-map's quality. User-guidance feedback may indicate an adjustment to the measurement geometry (e.g., "rotate object" or "move dimensioner up"). User-guidance feedback may also specify an adjustment to the handheld-dimensioner's settings (e.g., "change shutter speed"). In another exemplary embodiment, the user-guidance feedback may include information to facilitate the adjustment of lighting.

After complying with the user-guidance feedback, a user may take another dimension measurement. A new depth map is then created, evaluated, and compared to the threshold count. This process could repeat until the depth map's null-data pixel count is at, or below, the threshold count. Alternatively, this repetition could end after some fixed number of trials.

If the depth map's null-data pixel-count is at or below the threshold count then the depth-map quality is suitable for dimensioning. The processor uses the depth map to compute a dimension measurement. A confidence feedback may also be generated.

Confidence feedback may include a visible image of the handheld-dimensioner's field-of-view and a wireframe rendering of the object created from range data. This confidence feedback is shown in FIG. 2. In this example, the wireframe rendering 15 matches the object 5, and in this way, helps provide confirmation that the dimensioning measurement is valid.

The confidence feedback could also include a confidence value. The confidence value could, for example, correspond to the percentage of null-data pixels (e.g., [100%−null-data-pixel %]=confidence %). Using this approach, a confidence value of 100% is a perfect depth map (i.e., with no null-data pixels), while a confidence value of 0% would represent the worst possible depth map.

In another embodiment, the confidence feedback indicates the dimension measurement's conformance to a standard. Industry standards promote healthy business and consumer climates by providing specifications to insure uniform and equitable measurements. Standards may require a particular measurement accuracy. The confidence feedback could indicate that a dimension measurement meets the requirements stipulated in one or more industry standards.

The feedback types describe so far (i.e., user-guidance feedback, error feedback, or confidence feedback) could each include indications embodied in a variety of forms. Audio or visible messages could convey the feedback. Audio feedback could include sounds or voice commands. Visible feedback could include illuminated indicators and/or graphics/text displayed on a screen.

Figure 4:
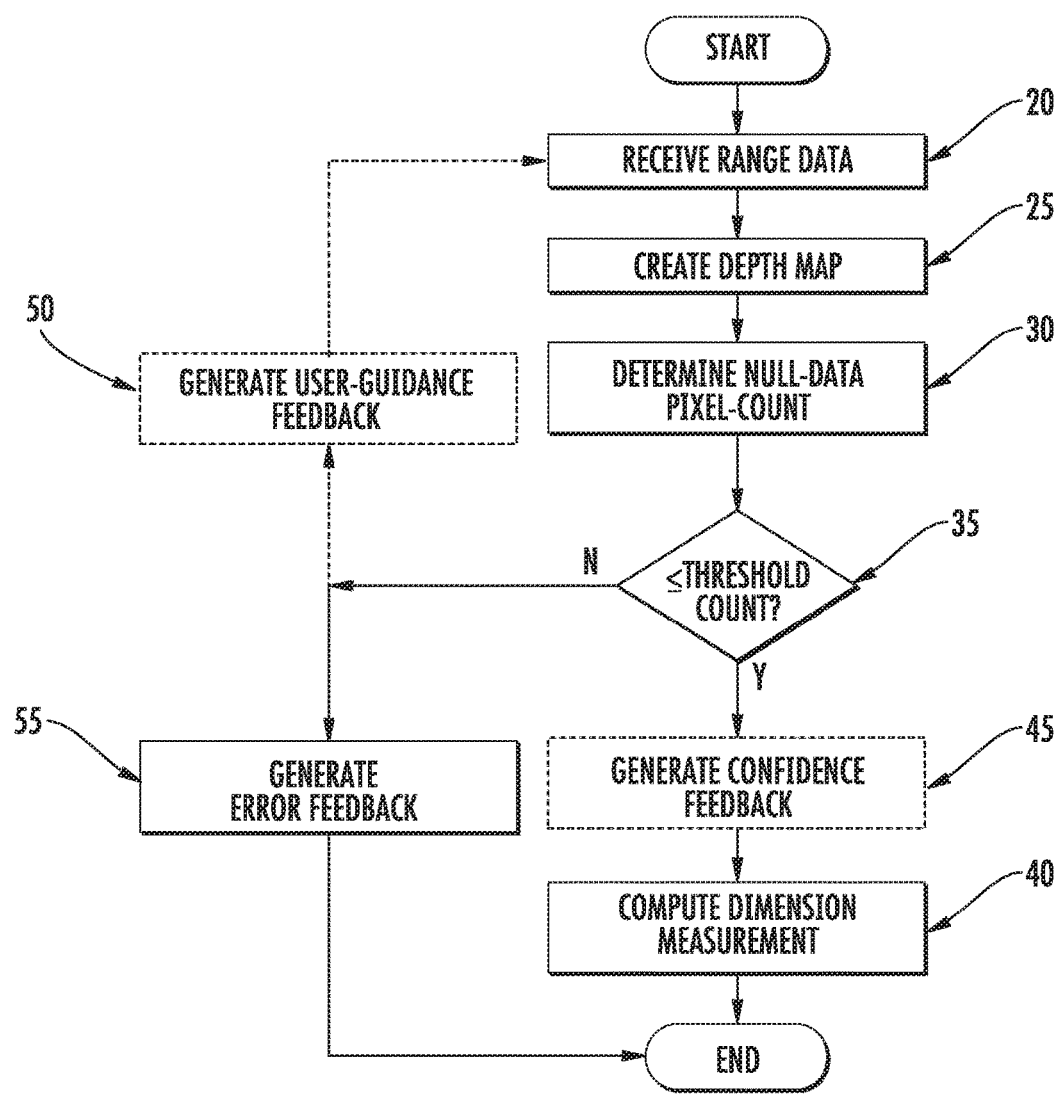
FIG. 4 schematically depicts a flowchart of an exemplary method for obtaining a dimension measurement using a handheld dimensioner.

FIG. 4 illustrates an exemplary a dimensioning measurement method including feedback based on a depth-map quality assessment. A handheld dimensioner is used obtain a dimension measurement. Range data is collected by a dimensioning subsystem that (in one possible embodiment) projects an infrared (IR) light pattern onto an object. The method begins with handheld dimensioner's processor receiving range data from the dimensioning subsystem 20. The processor then creates a depth map from the range data 25. This depth map may have null-data pixels. In the next step, the processor determines a null-data pixel-count 30 (i.e., summates the null-data pixels). The processor then compares the null-data pixel-count to a stored threshold count 35. This threshold count is based on a variety of factors that vary with application. The threshold count may be stored in the handheld dimensioner's memory and may be adjusted to meet the requirements associated with different applications.

If the null-data pixel-count is less than or equal to the threshold count, then the processor may compute a dimension measurement 40. In some embodiments, confidence feedback may be generated 45 and presented separately, or with, the dimension measurement.

If the null-data pixel count is greater than the threshold count, then the processor may (in some embodiments) use information derived from the depth map to generate user-guidance feedback 50. This user-guidance feedback facilitates the adjustment of the dimensioner, the environment, and/or the object for an improved range data acquisition. Acquiring range data, creating a depth map, and comparing the null-data in the depth map to a threshold count may repeat until a depth map with sufficient quality is obtained.

Error feedback may be generated 55 if the null-data pixel count is greater than the threshold count. This error feedback helps to alert the user that the data acquired is not suitable for a dimensioning measurement.

Figure 5:
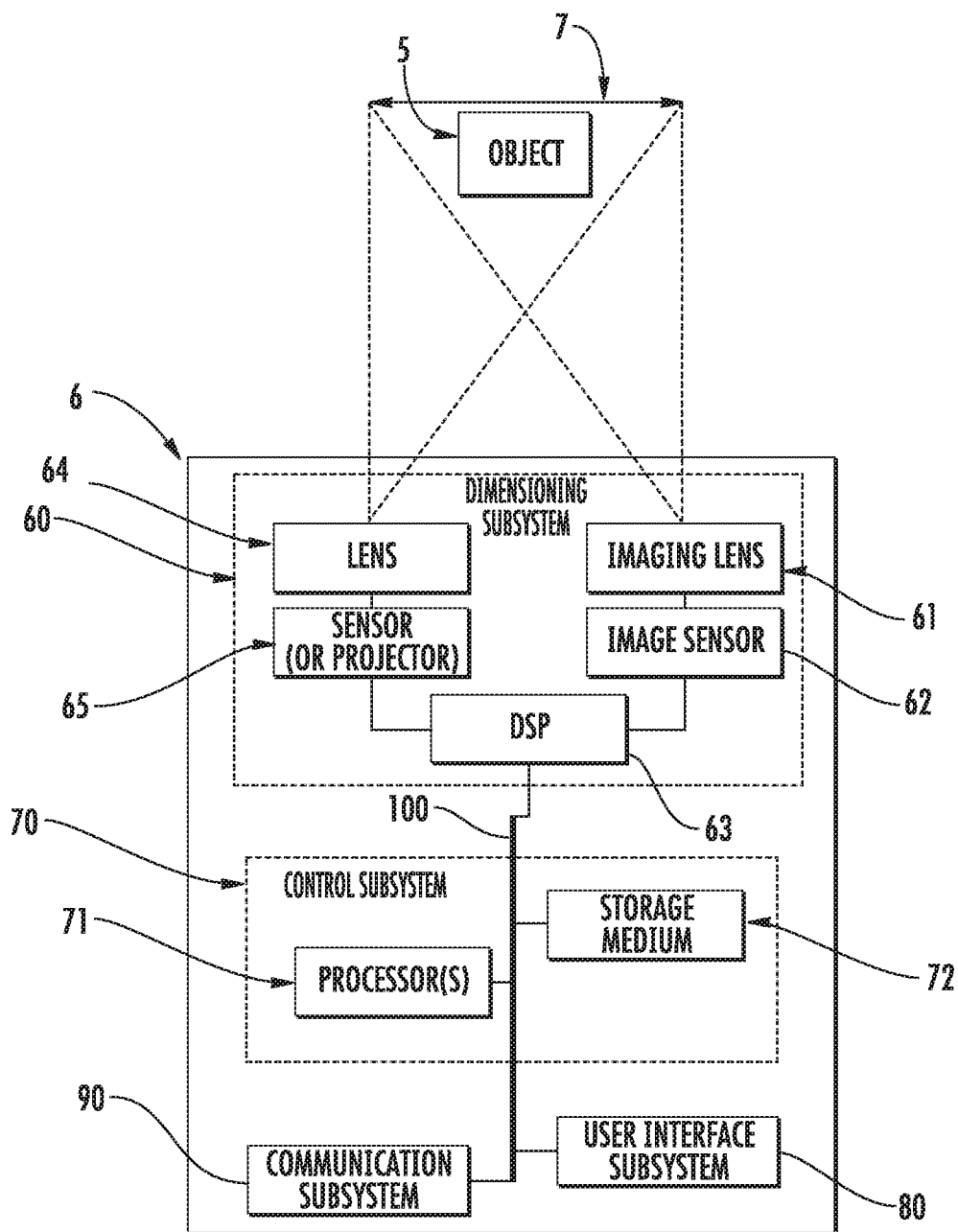
FIG. 5 schematically depicts an exemplary handheld dimensioning system configured to provide error feedback.

FIG. 5 schematically depicts a block diagram of an exemplary handheld dimensioning system configured to provide error feedback. An object 5 positioned in front of the dimensioning system 6 may have its dimensions (e.g., volume) measured optically. The dimensioner 6 utilizes a variety of subsystems to measure the object.

A dimensioning subsystem 6 uses at least one image sensor to capture range data of an object or objects within a field-of-view 7. To accomplish this, the dimensioning subsystem 60 uses an imaging lens 61 to focus a real image of the field-of-view 7 onto an image sensor 62 to convert the optical image into an electronic signal. The image sensor 62 may be a charge coupled device (i.e., CCD) or a sensor using complementary metal oxide semiconductor (i.e., CMOS) technology. The image sensor 62 typically includes a plurality of pixels that sample the real image and convert the real-image intensity into an electronic signal. A digital signal processor (i.e., DSP) 63 is typically included to facilitate the formation of the digital image.

The creation of range data (i.e., depth information) is facilitated by a second element in the dimensioning subsystem that either transmits an optical signal (i.e., projector) or images a scene (i.e., sensor). The lens 64 for the projector (or sensor) 65 is typically configured into a stereo arrangement with the imaging lens 61 to allow for the collection of depth information (e.g., using the principle of parallax). The projector (or sensor) 65 is typically communicatively coupled to the DSP 63 which may facilitate its control and communication.

A control subsystem 70 is communicatively coupled to the at least one image sensor (or the image sensor 61 and the projector 65) via the DSP 63. The control subsystem 70 includes one or more processors 71 (e.g., one or more controller, digital signal processor (DSP), application specific integrated circuit (ASIC), programmable gate array (PGA), and/or programmable logic controller (PLC)) to configure the imaging subsystem for the dimensioning data collection and to perform the processing to generate dimensioning measurements and feedback. The processor 71 may be configured by processor-executable instructions (e.g., a software program) stored in at least one non-transitory storage medium (i.e., memory) 72 (e.g., read-only memory (ROM), flash memory, and/or a hard-drive). The processor-executable instructions, when executed by the processor 71 configure the processor to: (i) receive range data from the dimensioning subsystem, (ii) create a depth map from the range data, (iii) process the depth map to obtain a depth-map quality, and (iv) generate an error feedback if the depth-map quality is below a minimum-quality threshold.

The dimensioning system 6 may also include a user-interface subsystem 80 to display dimension measurements (e.g., linear dimension or volume) and feedback. In some embodiments, the user-interface subsystem 80 may also facilitate the selection of objects and/or surfaces for dimensioning.

The dimensioner 6 may also include a communication subsystem 90 for transmitting and receiving information to/from a separate computing device or storage device. This communication subsystem 90 may be wired or wireless and may enable communication via a variety of protocols (e.g., IEEE 802.11, including WI-FI®, BLUETOOTH®, CDMA, TDMA, or GSM).

The subsystems in the dimensioner 6 are electrically connected via a couplers (e.g., wires or fibers) to form an interconnection subsystem 100. The interconnection system 100 may include power buses or lines, data buses, instruction buses, address buses, etc., which allow operation of the subsystems and interaction there between.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;

U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;

U.S. patent application Ser. No. 13/367,978 for a Laser Scanning Module Employing An Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application Ser. No. 29/468,118 for an Electronic Device Case, filed Sep. 26, 2013 (Oberpriller et al.);

U.S. patent application Ser. No. 14/055,234 for Dimensioning System, filed Oct. 16, 2013 (Fletcher);

U.S. patent application Ser. No. 14/053,314 for Indicia Reader, filed Oct. 14, 2013 (Huck);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/150,393 for Inciciareader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Reublinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.) and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method, comprising:
   receiving, with a processor, range data from a dimensioning subsystem;
   creating, with the processor, a distance map from the received range data;
   determining, with the processor, a null-data pixel-count from the distance map, the null-data pixel-count comprising a sum total of null-data pixels; and
   computing, with the processor, a dimension measurement if the null-data pixel-count is at or below a threshold count, or
   generating, with the processor, an error feedback if the null-data pixel-count is above the threshold count.

2. The method according to claim 1, wherein the distance map comprises a digital image of a dimensioner's field-of-view, wherein the digital-image's pixel values correspond to the distance between the dimensioner and an object or objects in the field-of-view.

3. The method according to claim 2, wherein the distance map's null-data pixels comprise a single pixel value, the single pixel value indicating that a range measurement for a pixel was not possible.

4. The method according to claim 1, comprising generating a confidence feedback if the distance map's null-data pixel-count is below the threshold count.

5. The method according to claim 4, wherein the confidence feedback comprises a visible image of a dimensioner's field-of-view and a wireframe rendering of an object, the wireframe rendering displayed with the visible image.

6. The method according to claim 4, wherein the confidence feedback comprises an indication of a confidence value, the confidence value corresponding to the null-data pixel count.

7. The method according to claim 4, wherein the confidence feedback comprises an indication of the dimension measurement's conformance to a standard.

8. The method according to claim 1, comprising generating a user-guidance feedback if the null-data pixel-count is above the threshold count.

9. The method according to claim 8, wherein the user-guidance feedback comprises information to facilitate the adjustment of a measurement geometry.

10. The method according to claim 8, wherein the user-guidance feedback comprises information to facilitate the adjustment of lighting.

11. The method according to claim 8, comprising repeating the receiving, creating, determining, and generating until the distance map's null-data pixel-count is at or below the threshold count then computing a dimension measurement.

12. The method according to claim 1, wherein the error feedback comprises audio feedback.

13. The method according to claim 1, wherein the error feedback comprises illuminated indicators and/or graphics displayed by the dimensioner.

14. The method according to claim 1, wherein the error feedback comprises an indication that the object color is too dark or that the lighting is insufficient.

15. A system, comprising:
   a dimensioning subsystem comprising at least one image sensor for capturing range data of an object or objects within a field-of-view; and
   a processor communicatively coupled to the at least one image sensor, wherein the processor is configured to:
      receive range data from the dimensioning subsystem;
      create a distance map from the range data;
      process the distance map to obtain a distance-map quality comprising a sum of the number of pixels in the distance map having insufficient information to determine distance; and
      generate an error feedback if the distance-map quality is below a minimum-quality threshold.

16. The system according to claim 15, wherein the dimensioning subsystem comprises a pattern projector, the pattern projector projecting a light pattern on the object or objects in the field-of-view.

17. The system according to claim 15, wherein the error feedback comprises user guidance information to facilitate the repositioning of the dimensioner to capture range data having an improved distance-map quality.

18. The system according to claim 15, comprising a user-interface subsystem for displaying dimension measurements and the error feedback.

19. The system according to claim 15, comprising a communication subsystem for transmitting and receiving information to/from a computing device and/or a storage device.

20. The system according to claim 15, comprising a display for displaying dimension measurements and the error feedback.

* * * * *